INVENTOR
EDWARD VICTOR LAWSON HUGHES

June 13, 1972  E. V. L. HUGHES  3,669,517
HYDROSTATIC/HYDRODYNAMIC SHAFT BEARING ARRANGEMENTS
Filed Aug. 24, 1970  2 Sheets-Sheet 2

INVENTOR
EDWARD VICTOR LAWSON HUGHES
BY
Watson, Cole, Grindle & Watson
ATTORNEY

United States Patent Office 3,669,517
Patented June 13, 1972

3,669,517
HYDROSTATIC/HYDRODYNAMIC SHAFT
BEARING ARRANGEMENTS
Edward Victor Lawson Hughes, Solihull, England, assignor to Corporation of The City of Coventry, Coventry, England
Filed Aug. 24, 1970, Ser. No. 66,412
Claims priority, application Great Britain, Aug. 26, 1969, 42,418/69
Int. Cl. F16c 33/66
U.S. Cl. 308—122
5 Claims

ABSTRACT OF THE DISCLOSURE

Hydrostatic/hydrodynamic shaft bearing arrangements are disclosed in which journalling of a shaft in a bearing body is provided with at least one journal portion formed with helicoidal relief for effecting hydrodynamic pumping of lubricant from low pressure lubricant supply passageway means in the bearing body to plain bearing journalling or location of the shaft relative to the bearing body via separate high pressure lubricant flow passageway means in the bearing body for hydrostatic lubrication at said plain bearing journaling or location.

The object of this invention is to provide a simple and effective construction and arrangement of shaft bearing incorporating the advantages of both hydrostatic and hydrodynamic operation especially as regards load carrying capacity at high speeds of shaft rotation. Practical advantages in this respect will be apparent from the following disclosure.

Figure 1:
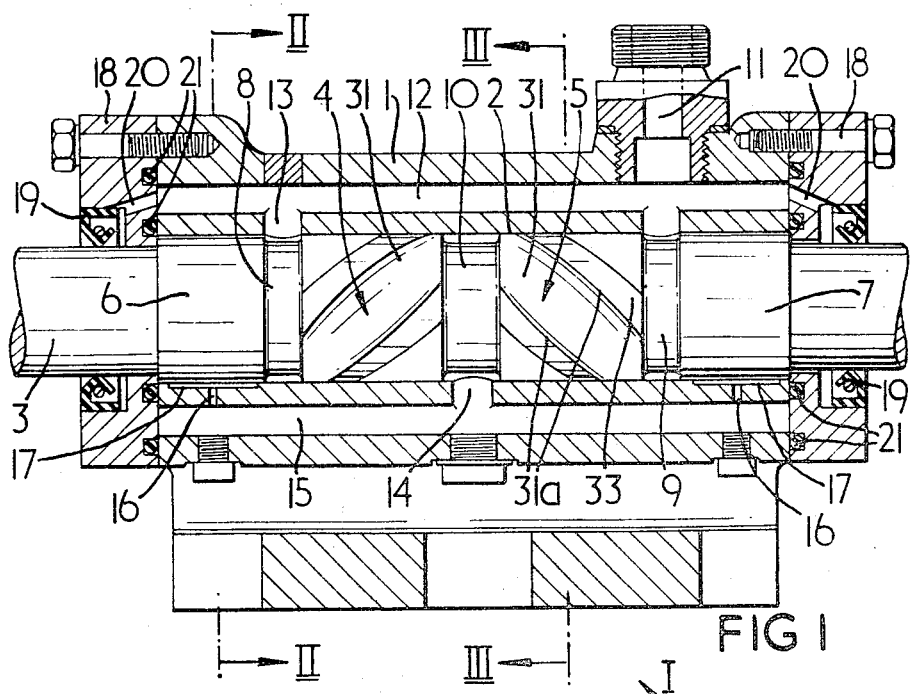
Figure 2:
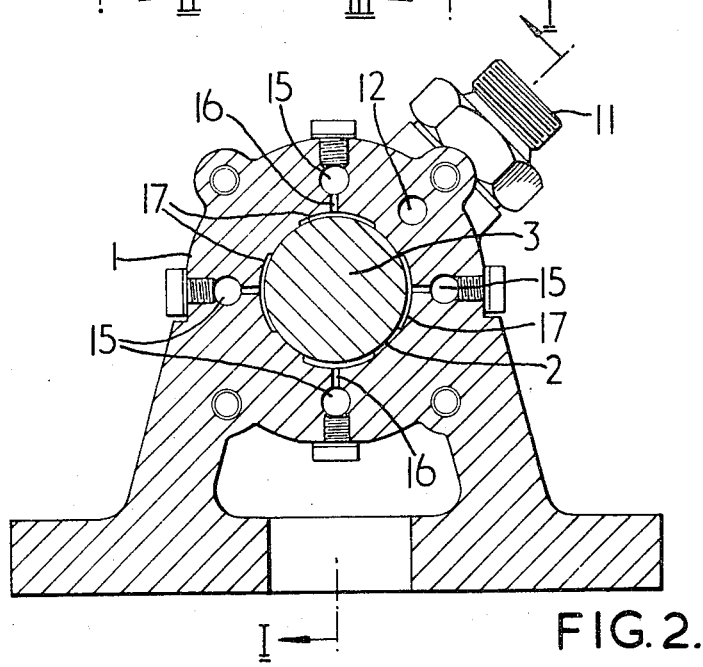
Figure 3:
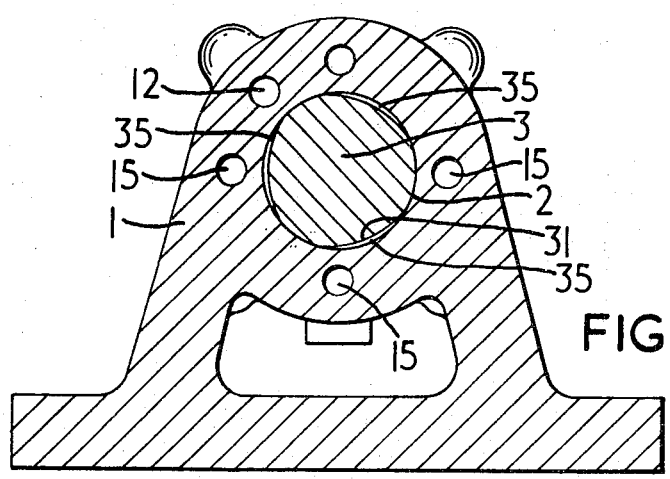
Figure 4:
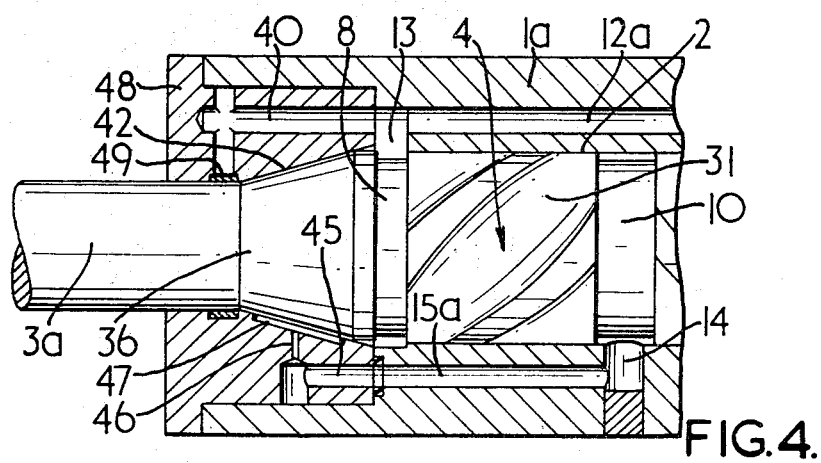
Figure 5:
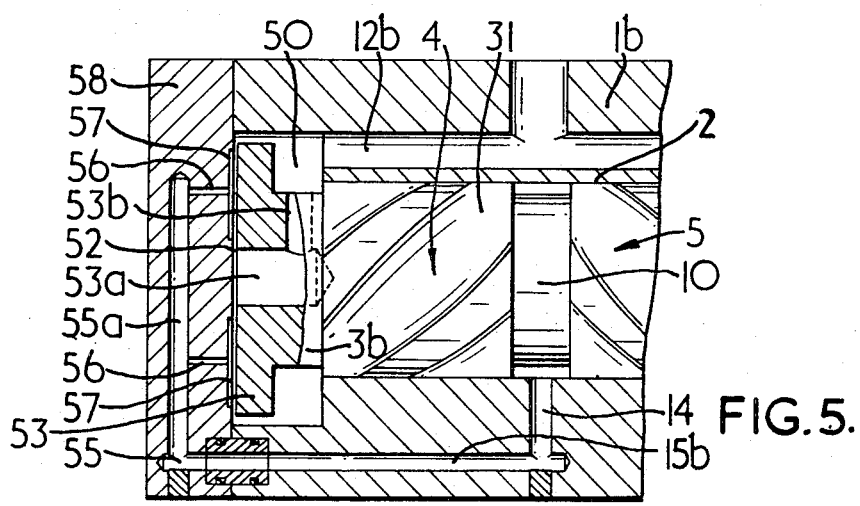

In practical embodiments of the invention the construction and arrangement is as follows, reference being had to the accompanying drawings in which:

FIG. 1 is an axial plane section of the shaft bearing arrangement taken on the line I—I of FIG. 2, FIGS. 2 and 3 are cross sections taken on the lines II—II and III—III respectively of FIG. 1, FIGS. 4 and 5 are part axial plane sectional views similar to FIG. 1 but each showing a modification.

Like parts are designated by the same or similar reference numerals throughout the drawings.

The bore 2 of the bearing body 1 receives a shaft 3 which is shown provided with four journal formations 4, 5, 6, 7, separated by annular reduced portions or channels 8, 9, 10.

The two central adjacent journal portions 4, 5 of the shaft 3 are machined or formed with helicoidal relief or grooving 31 which in each case is such as to effectively perform the function of a screw viscosity pump, the helicoidal relief or grooving 31 of one portion 4 being of opposite hand to that of the other portion 5.

The heicoidal relief 31 is of shallow substantially flat form laterally blending at 31a with adjacent full diameter portions of the intervening land 33 such that a very small clearance 35 (FIG. 3) is provided between the helicoidal relief 31 and the bore 2 of the bearing body 1. Owing to the small clearance 35 high speeds of rotation of the shaft 3 are possible before undesired turbulence or vortex formation occurs in the oil film between the shaft 3 and bore 2.

The helicoidal relief 31 can be formed by machining the journal portions 4, 5 with a rotary abrading or cutting tool such as a grinding wheel of plain cylindrical peripheral form which is traversed in timed relationship with rotation of the shaft 3 and with the plane of rotation of the tool inclined to the axis of the shaft at an angle in accordance with the required helix angle of the relief 31.

The bearing body 1 is provided with an inlet 11 for receiving lubricant such as a suitable oil at low pressure which by suitable passageway means in the body is fed to the outer annular channels 8, 9. Thus in the example shown the channel 9 is fed directly from the inlet 11 whilst the other channel 8 is fed via an axially parallel passageway 12 and radial port 13 in the body 1 from the inlet 11.

The pumping action of the helicoidally relieved or grooved portions 4, 5 of the shaft 3 is such as to pump the oil to the central annular channel 10 from where it passes at relatively high pressure via radial ports 14 and axially parallel passageways 15 and also radial ports 16 in the body to those parts of the bore 2 of the latter in which plain journal portions 6, 7 of the shaft 3 are disposed for effecting hydrostatic lubrication thereof. For this purpose the corresponding portions of the bearing body bore 2 are formed with pockets 17 for accommodating oil under pressure in direct contact with the plain journal portions 6, 7.

Thus the plain journal portions 6, 7 perform the function of a normal hydrostatic bearing with inherent stiffness, stability and low co-efficient of friction whilst the helicoidally relieved portions 4, 5 perform the function of a hydrodynamic bearing and also serve to supply lubricant at high pressure to the hydrostatic journal portions 6, 7.

The shaft 3 is shown axially located in the bearing body by end caps 18 to the latter which carry shaft seals 19 to which the low pressure passageway 12 is vented at 20 and also provide or accommodate end sealing 21 to the axially parallel passageways 12 and 15.

If desired a relief valve may be provided to the high pressure side of the oil supply system such as between a passageway 15 and an annular channel 8 or 9.

Whereas the balanced and stable arrangement of shaft bearing herein described and shown is preferred in practice, other arrangements are possible within the scope of this invention for achieving the same result such as the provision of helicoidally relieved portions of opposite hand, one at each of a central plain journal portion of suitable length and with appropriate annular channelling of the shaft operating in conjunction with corresponding porting and passageways in the bearing body.

If necessary, provision can be made to divert some of the high pressure lubricant i.e. from a passageway 15 for circulatory cooling.

Referring to FIG. 4 and as indicated by the same or similar reference numerals the arrangement is generally the same as that already described with reference to FIGS. 1, 2 and 3 except that one or both parallel plain journal portions 6, 7 is or are replaced by a taper plain journal portion 36 of the shaft 3a received by a corresponding taper bore 42 of an end cap member 48 to the bearing body 1a. Extension of the passageways 15a in the body 1a for high pressure oil flow is provided by corresponding passageways in the end member 48 one of which is shown at 45 and which communicates with a coresponding pocket 47 in the taper bore 42 by a radial port 46.

Similarly extension of the passageway 12a in the body 1a for low pressure oil flow is provided by a passageway 40 in the end member 48 to a shaft seal 49 in the latter.

As will be appreciated the arrangement also provides hydrostatic bearing support against some axial loading on the shaft 3a.

In FIG. 5 a further development is shown in the form of a thrust bearing for one end of the shaft 3b wherein a head 53 at the end of the shaft bears against a corresponding face 52 of an end cap 58 to the bearing body 1b. As shown at 55 the end cap 58 contains a continuation of each passageway 15b in the body 1b for high pressure oil flow to a transverse passageway 55a which in turn supplies the oil at high pressure to ports 56 communicating with pockets 57 in the face 52.

Thus hydrostatic thrust bearing location or support is provided between the face 52 of the end cap 58 and the head 53 of the shaft 3b whilst escape of oil from between the face 52 and head 53 is able to pass either directly to the clearance 50 in the body 1b about the head 53 or via axial and radial bores 53a, 53b therein to the clearance 50 which latter communicates with the passageway 12b in the body 1b for low pressure oil flow.

What I claim is:

1. A hydrostatic/hydrodynamic shaft bearing arrangement comprising a bearing body having provided therein a shaft bore, low pressure lubricant supply passageway means and separate high pressure lubricant flow passageway means; a shaft journalled in said bore and having plain bearing location in relation to the bearing body, said shaft having at least one journal portion formed with helicoidal relief therein and arranged to receive lubricant from said low pressure lubricant supply passageway means via annular channelling about the shaft, the helicoidally relieved journal portion of the shaft being for effecting hydrodynamic pumping of lubricant at relatively high pressure over the supply pressure to further annular channelling about the shaft which further channelling is in communication with the high pressure lubricant flow passageway means for lubricant flow to the plain bearing location of the shaft for hydrostatic lubrication at said plain bearing location.

2. A hydrostatic/hydrodynamic shaft bearing arrangement according to claim 1 wherein the shaft is provided with two separate journal portions each formed with helicoidal relief therein of opposite hand to one another, the further annular channelling about the shaft being disposed between the helicoidally reieved journal portions for receiving lubricant pumped thereto in opposite directions from said helicoidally relieved journal portions for passage via the high pressure lubricant flow passageway means to the plain bearing location of the shaft.

3. A hydrostatic/hydrodynamic shaft bearing arrangement according to claim 1 wherein the shaft journal portion formed with helicoidal relief is disposed between two portions of plain bearing location of the shaft in relation to the bearing body and to which bearing location portions lubricant is supplied by the pumping action of the helicoidally relieved shaft journal portion via the further annular channelling and the high pressure lubricant flow passageway means for the hydrostatic lubrication of said plain bearing location portions.

4. A hydrostatic/hydrodynamic shaft bearing arrangement according to claim 1 wherein at least part of the plain bearing location of the shaft in relation to the bearing body is of taper form for bearing some axial load on the bearing arrangement.

5. A hydrostatic/hydrodynamic shaft bearing arrangement according to claim 1 wherein at least part of the plain bearing location of the shaft in relation to the bearing body is provided between end faces of the shaft and bearing body for providing thrust bearing support.

References Cited
UNITED STATES PATENTS

| | | | |
|---|---|---|---|
| 2,986,096 | 5/1961 | Booth et al. | 308—98 |
| 3,420,583 | 1/1969 | Hirs | 308—9 |
| 3,517,973 | 6/1970 | Hirs | 308—9 |

MARTIN P. SCHWADRON, Primary Examiner

F. SUSKO, Assistant Examiner